United States Patent Office

3,401,143
Patented Sept. 10, 1968

3,401,143
METHOD OF MAKING PIGMENTED POLYESTER-URETHANES AND SAID PRODUCT
Anthony F. Finelli and James C. West, Akron, Ohio, assignors to The Goodyear Tire & Rubber Company, Akron, Ohio, a corporation of Ohio
No Drawing. Continuation of application Ser. No. 536,973, Mar. 24, 1966. This application May 10, 1967, Ser. No. 637,610
7 Claims. (Cl. 260—40)

ABSTRACT OF THE DISCLOSURE

This invention relates to a method of forming nondiscoloring polyesterurethanes which are pigmented to give the desired color match characteristics relative to pigmented lacquers where the pigmented lacquers are the normal commercial acrylic resin, vinyl acrylic resin and nitrocellulose lacquers and the nondiscoloring polyesterurethane is the reaction product of an organic polyisocyanate having all the isocyanate groups attached to nonbenzoid carbon atoms and the excess isocyanate is at least partially reacted with a nonaromatic primary diamine.

---

This application is a continuation of application Ser. No. 536,973, filed Mar. 24, 1966.

This invention relates to a method of obtaining pigmented polyurethanes and to said pigmented polyurethanes. More particularly, it relates to nondiscoloring pigmented polyesterurethanes.

Recently the use of polyurethanes for the preparation of interior trim articles in automobile construction such as foamed crash pads and horn buttons has become accepted in commercial practice. One of the problems associated with the use of polyurethanes, especially in the sprayed polyurethanes, is matching the colors with the other interior colors of the decorative finish of the automobile as well as getting color stability.

An object of this invention is to provide a method for readily matching the interior colors of the decorative finish of the automobile accessories and thereby obtain said matched colored articles.

The objects and advantages of this invention may be obtained by blending a pigmented lacquer of the nature hereinafter described into one of the components of the polyurethane reaction mixture or the polyurethane reaction mixture per se. Then the pigmented polyurethane reaction mixture can be shaped to obtain the desired finish or colored shaped article.

The polyurethane reaction mixture especially useful in this invention comprises (1) a polyester polyol having a molecular weight of at least about 500 and no more than about 6000 and preferably 1000 to 3000, (2) an organic polyisocyanate having all the isocyanate groups attached to nonbenzoid carbon atoms, (3) a nonaromatic primary diamine. Said polyisocyanate and said diamine preferably are selected so that the reaction between them in their solutions in boiling methylene chloride of 0.2 to 0.5 molar concentration causes a turbidity inside of 30 seconds. For these polyurethane reaction mixtures to be spreadable, it is desirable that they contain a suitable inert solvent. These spreadable polyurethane reaction mixtures can be brushed, dipped, sprayed or otherwise applied to a suitable shaping or complementary surface to obtain a film, fabricated or molded articles and related shaped polyurethanes which have improved resistance to discoloration after 100 hours in the weatherometer as determined by ASTM method E42–57 and ASTM D-1499-59T.

The spreadability of these polyurethane reaction mixtures is best assured where the reaction mixture comprises (1) a polyester polyol or diol having a molecular weight of about 900 to 3500, (2) a nonaromatic organic polyisocyanate, (3) a nonaromatic primary diamine, and (4) sufficient inert solvent to render the mixture spreadable.

Preferred results are obtained when the polyester polyol is first reacted with an organic polyisocyanate having all the isocyanate groups attached to nonbenzenoid carbon atoms and then the nonaromatic primary diamine is added to the resulting reaction product. Since the nonaromatic organic polyisocyanates and nonaromatic primary diamines utilized develop a turbidity according to the Muller hot methylene chloride test described in U.S. 2,620,516, it has been discovered that a particularly useful technique for improving and for prolonging the spreadability of the polyurethane reaction mixture is to heat or age the organic diamine with a ketone selected from the class consisting of acetone and methyl ethyl ketone. Thus, those ketones may be utilized as a part or all of the solvent in making polyurethane reaction mixtures which remain spreadable for a longer time.

Representative classes of polyester polyols are made by condensation of a polycarboxylic acid or anhydride with a polyol. Representative polycarboxylic acids are the aliphatic dicarboxylic acids such as adipic, glutaric, suberic, sebacic and azelaic, and the aromatic acids such as phthalic, terephthalic and isophthalic and the corresponding tri and higher functionality carboxylic acids. Representative polyols are the glycols such as ethylene, propylene, butylene and higher, the triols such as glycerol, trimethylol propane and trimethylolethane and the tetrols such as pentaerythritol and the hexols.

Representative of the organic polyisocyanates having all the isocyanate groups attached to nonbenzenoid carbon atoms which are useful in this invention are m-xylylene diisocyanate, 4,4'-methylene-bis(cyclohexylisocyanate), p-methane diisocyanate, bis(2 - isocyanatoethyl)fumarate, bis(2-isocyanatoethyl)carbonate, bis(2-isocyanatoethyl)-4-cyclohexene-1,2-dicarboxylate and hexamethylene diisocyanate, 1-methyl cyclohexyl-2,4-diisocyanate, 1-methyl cyclohexyl-2,6-diisocyanate and mixtures of 1-methyl-cyclohexyl-2,4-diisocyanate and 1-methyl cyclohexyl-2,6-diisocyanate.

Representative of the nonaromatic primary diamines are 1,4-cyclohexane-bis(methylamine), p-menthane diamine, 1,6-hexamethylene diamine, trans-1,2-cyclobutane-bis(methylamine), 1-methyl cyclohexyl-2,4-diamine, diamino cyclopentane and ethylene diamine, meta-xylylene diamine, mixtures of meta/para xylylene diamine preferably 70/30 meta/para, 4,4'-diaminodicyclohexyl methane, isophorone diamine, 2,3,5,6-tetrachloro-p-xylene-α,α'-diamine.

Although the polyurethane reaction mixtures may be made by simultaneously mixing the polyester polyol, the organic polyisocyanate and the diamine, it is preferred that the polyester polyol and the organic polyisocyanate be first reacted to give a prepolymer and the diamine be added. Also, it has been observed that about 1.3 to 3 mols of organic polyisocyanate may be used for each mol of reaction hydrogen containing material although slightly lower and higher ratios may be utilized but it has been observed that the resulting physical properties of the cured product are not as satisfactory as those obtained at the above ratios. The amount of diamines used should be about .5 to 0.95 mol for each of free isocyanate present. This is especially true where the final cure and shaping of the reaction mixture is to be carried out at room temperature. Although it has been found that .7 to about 1.2 mols of diamine for each mol of free isocyanate may be utilized, the higher ratio in excess of 1 will adversely affect the physical properties.

It should be emphasized that where the amount of diamine utilized is essentially equivalent to the free isocyanate that the physical properties of the cured material will usually be in the neighborhood of 4000 pounds per square inch tensile or higher whereas at the extreme ranges of diamine to free isocyanate quoted above the tensile properties may be no higher than about 1200 pounds per square inch.

Since the polyurethane reaction mixtures of this invention are essentially nondiscoloring after exposure for a hundred hours in a weatherometer, the especially valuable results of this invention are obtained when the polyurethane reaction mixture contains various pigments, usually in the ratio of about 0.5 to 100 parts per hundred parts of said reaction mixture. Normally, about 2 to 20 parts and preferably about 5 to 10 parts of pigment will be sufficient to give the desired aesthetic effect. It should be emphasized that the well-known inorganic pigments such as titanium oxide, lead sulfate, chrome yellows, rouge and other pigments of the inorganic type may be utilized in this invention. Similarly, the organic pigments such as the resorcinol greens, indigo, turkey red, triphenyl methane dyes, xanthene dyes, the stilbene and other dyes such as those listed in William T. Caldwell's book on organic chemistry, copyrighted in 1943, Riverside Press, starting at page 702 through page 725 may be used, too.

As indicated above the pigments are best added to the polyesterurethane reaction mixture as a dispersion in a lacquer made by dissolving an acrylic resin, a vinyl-acrylic resin or a nitrocellulose resin in a suitable lacquer solvent, although it may be added incorporated in one or more of the ingredients making up the polyesterurethane reaction mixture, also, all the ingredients including the pigmented lacquer may be added simultaneously.

The lacquers may contain as much as about 90% solvent by weight but preferably the solvent concentration is lower, i.e., 40–30% but sufficient to prevent feathering or cobwebbing when the lacquer is sprayed.

Our invention is illustrated but not limited by the following examples in which the parts and percentages are by weight unless otherwise stated.

EXAMPLE 1

A prepolymer was prepared from 8,000 parts of 80% ethylene, 20% propylene adipate (Reactive No. 62 and acid number less than 2) and 2352 parts of methylene-bis(4-cyclohexylisocyanate) in the following manner:

The polyester was degassed under vacuum at 76–100° C. for one hour. The molten diisocyanate was then added and allowed to react at 90–114° C. for one hour. Vacuum was then applied slowly (to prevent vigorous frothing) over a period of one hour. This polymer had a 3.5% isocyanate content.

The prepolymer was diluted as follows:

| | Parts |
|---|---|
| Prepolymer | 100 |
| Methyl ethyl ketone | 30 |
| Toluene | 30 |
| Butyrate solution [1] | 5 |
| | 165 |

[1] 10% by weight of cellulose acetate butyrate dissolved in ethylene glycol monoethyl ether acetate.

The diluted prepolymer showed 2.0% isocyanate content.

EXAMPLE 2

The diluted prepolymer from Example 1 (50 parts), diluted burgundy lacquer (20 parts), this is a standard automotive padded trim top coat lacquer, and a curative solution (8.5 parts) were mixed well at room temperature. Films were drawn on polyethylene slabs and allowed to cure at room temperature.

The cured film having the burgundy color had the following physicals:

| | |
|---|---|
| Tensile (p.s.i.) | 4600. |
| Elongation, percent | 620. |
| Gauge | 0.010. |
| Weatherometer: | |
| After 100 hours | Negligible color change. |
| After 200 hours | Tensile/elongation 3800 p.s.i./580%. |

The base lacquer was a blend of the basic recipe:

| | Parts |
|---|---|
| Vinyl chloride-vinyl acetate copolymer 90/10 | 25 |
| Vinyl chloride-vinyl acetate copolymer 86/14 | 25 |
| Copolymer of ethyl acrylate and methyl methacrylate | 50 |
| Pigments for color desired | 25–100 |
| Solvents sufficient to give a finished lacquer of approximately 20–40 percent solids where the solvent is toluene, xylene and methyl isobutyl ketone. Prior to use with the polyurethanes the basic lacquer may be diluted 1/1 with a 1/1 mixture of xylene/methyl isobutyl ketone | 500–800 |

The curative solution (sometimes abbreviated as CBMA) is prepared by heating a mixture of 20 parts 1,4-cyclohexane-bis(methylamine) and 80 parts methyl ethyl ketone to 70° C. over a period of nine minutes. The methyl ethyl ketone lost by evaporation is replaced.

EXAMPLE 3

A mix was prepared from 50 parts diluted prepolymer of Example 1, 25 parts diluted vinyl acrylic turquoise lacquer and 8.5 parts curative solution (CBMA). Films were drawn on polyethylene slabs and allowed to air cure.

The turquoise stock showed the following physicals:

| | |
|---|---|
| Tensile (p.s.i.) | 5300. |
| Elongation, percent | 520. |
| Crescent tear (lbs./in.) | 400. |
| Weatherometer:/ | |
| After 100 hours | Negligible color change. |
| After 200 hours | Tensile/elongation 3700 p.s.i./600%. |

EXAMPLE 4

A dark turquoise padded automotive dash skin or so-called foam crash pad skin was prepared from a recipe based on 100 parts of the diluted prepolymer of Example 1, 50 parts of the dark turquoise lacquer and 17 parts 1,4-cyclohexane-bis(methylamine) curative solution. The mix was sprayed on an embossed silicone rubber crash pad mold to build up a polyurethane skin or film and then cured. On exposure of the cured film in the Fadeometer for 200 hours, there is negligible color or gloss change. A foam back was applied to the skin according to conventional padded dash techniques to give a foamed padded dash assembly.

Another burgundy padded dash skin was prepared as above using 50 parts diluted burgundy lacquer. The polyurethane-vinyl-acrylic composite shows negligible change in color or gloss after 200 hours exposure in the Fadeometer.

EXAMPLE 5

A prepolymer having an isocyanate content of 4.4% was prepared from one mol each of a tetramethylene adipate having 1000 molecular weight and 2000 molecular weight and four moles 4,4'-methylene-bis(cyclohexylisocyanate) and diluted with sufficient toluene to give a solution of fifty percent prepolymer. A curative solution was prepared from 100 parts 4,4'-methylene-bis(cyclohexylamine) and 400 parts methyl ethyl ketone.

The diluted prepolymer (50 parts) was mixed with a mixture of the curative solution (12.4 parts) and 5 parts of a high pigment concentration red vinyl-acrylic lacquer (H. B. Davis Division, Conchemco Chemical Coatings)

and films were prepared by spreading and spraying on suitably embossed silicone rubber pads. The red polyurethane vinyl-acrylic composite is suitable for automotive padded interiors. It showed negligible discoloration after 200 hours in the Fadeometer. The red film showed the following stress-strain properties:

Tensile _____ p.s.i.__ 5000
Elongation _____ percent__ 490

EXAMPLE 6

A mix was prepared from 50 parts diluted prepolymer prepared by diluting a portion of the prepolymer of Example 5 with acetone (50%) and 8.7 parts curative solution (prepared with 100 parts m-xylylene diamine and 400 parts acetone) and 5 parts of a high pigment concentration green acrylic lacquer. The acrylic lacquer is Forbes (Forbes Finishes Division, Pittsburgh Plate Glass Company) Duracryl interior light green. The mix was spread and sprayed on embossed silicone plates. The green leather textured polyurethane-acrylic composite showed negligible discoloration after 200 hours in the Fadeometer Test and excellent color match with the standard automobile interior paints. The sheet showed tensile (p.s.i.) 3300 and elongation (percent) 425.

EXAMPLE 7

A 100 parts of a prepolymer prepared from one mole tetramethylene adipate having a 1000 molecular weight and 2 moles 4,4'-methylene-bis(cyclohexylisocyanate) was diluted with a mixture of toluene (30 parts), acetone (30 parts) and 5 parts butyrate solution from Example 1. The diluted prepolymer (50 parts) having a 3% isocyanate content was mixed with 13.3 parts of curative solution. Sheets were spread on silicone rubber pads having an embossed leather grain surface design. A blue vinyl acrylic lacquer used per se as an automotive padded trim topcoat at 20% solids was added to the prepolymer/curative mix before spreading in amount of 0, 5, 10 and 15 parts per 50 parts of diluted prepolymer. The curative solution was prepared from 100 parts 1,4-cyclohexane-bis(methylamine) and 400 parts methyl ethyl ketone. This was aged 24 hours at room temperature before use to form sheets.

The cured sheets had the physical properties indicated:

| Pigment, parts/50 parts | 0 | 5 | 10 | 15 |
|---|---|---|---|---|
| Tensile (p.s.i.) | 3,600 | 3,900 | 4,500 | 4,800 |
| Elongation, percent | 360 | 380 | 340 | 340 |

The pigmented vinyl-acrylic polyurethane composites had good color stability.

A further benefit obtained by use of lacquers is that the resulting sheets or films are more uniform and essentially free of peaks, a phenomena associated with spray coatings.

EXAMPLE 8

The reaction mixture of Example 2 was made by mixing the diluted prepolymer containing the diluted burgundy lacquer and the curative and then immediately the resulting mixture was extruded downward from a filament extruding head to form a continuous colored filament upon evaporation of the solvent.

Alternatively, thread or continuous filament may be produced by cutting the filament from a large sheet of film.

Other aliphatic diamines such as those having 3 to 20 carbon atoms may be used instead of ethylene diamine but it should be borne in mind that some of the lower diamines, i.e. those of 4 and 5 carbon atoms, have distasteful odors.

Other inert solvents than the hydrocarbons boiling below about 260° C. may be used, for example, the other solvents normally used in making paints or lacquers such as nitropropane, ethyl formate, alkyl formate, alkyl acetate, ethyl acetate, ketones other than those previously listed, and the chlorinated hydrocarbons boiling below about 260° C. Usually the solvent is used in as little as 5 to 20 parts to as much as 70 to 100 parts per hundred parts of prepolymer.

While certain representative embodiments and details have been shown for the purpose of illustrating the invention, it will be apparent to those skilled in this art that various changes and modifications may be made therein without departing from the spirit or scope of the invention.

We claim:
1. A method for making a shaped pigmented nondiscoloring polyesterurethane having the desired color match characteristics relative to the starting pigmented lacquer comprising:
   (1) forming a liquid polyesterurethane reaction mixture containing about 0.5 to about 100 parts of pigment for each hundred parts of the mixture, said reaction mixture being formed by adding the pigmented lacquer to said mixture per se, either simultaneously with at least one of the other ingredients of said mixture or in admixture with at least one of the other ingredients of said mixture, the other ingredients of the mixture comprising essentially a polyester polyol of about 500 to 6000 molecular weight, about 1 to about 3 mols of an organic polyisocyanate having all its isocyanate groups attached to nonbenzoid carbon atoms for each mol of polyester polyol and about 0.5 to about 1.2 mols of a nonaromatic primary diamine for each mol of excess organic polyisocyanate,
   (2) applying said reaction mixture to a complementary surface, and
   (3) curing to form a shaped polyesterurethane, said pigmented lacquer consisting essentially of a solvent solution of a synthetic resin suitable for forming lacquers or paints selected from the class consisting of acrylic resin, and vinyl acrylic resin, a lacquer solvent for said resin, and a pigment.

2. The method of claim 1 wherein the pigmented lacquer contains an acrylic resin suitable for forming a paint or lacquer.

3. The method of claim 1 wherein the pigmented lacquer contains a vinyl acrylic resin comprising a mixture of an acrylic resin and a vinyl resin, said resin being suitable to form a paint or lacquer.

4. The method of claim 1 wherein at least about 1.3 to 2 mols of polyisocyanate is used for each mol of polyester polyol.

5. The method of claim 1 wherein the pigmented lacquer contains from about 90 percent to about 30 percent by weight of solvent and includes a sufficient amount of solvent to prevent cobwebbing upon spraying the lacquer.

6. The method of claim 1 wherein the pigment is present in the amount of 2 to 20 parts per 100 parts of the reaction mixture.

7. The method of claim 3 wherein the vinyl acrylic resin comprises a mixture of about 50 parts of a vinyl resin and about 50 parts of an acrylic resin.

References Cited

UNITED STATES PATENTS

| 3,149,995 | 9/1964 | Bauer | 260—40 |
| 3,137,671 | 6/1964 | Bosshard | 260—40 |
| 3,316,189 | 4/1967 | Adams | 260—40 |
| 2,884,340 | 4/1959 | Loshaek | 260—40 |

FOREIGN PATENTS

| 714,122 | 7/1965 | Canada. |
| 886,967 | 1/1962 | Great Britain. |

OTHER REFERENCES

Taylor: Paint Technology Manuals, part III, 1962, p. 159–160, 162 and 164.

JULIUS FROME, *Primary Examiner.*